US012154731B2

(12) United States Patent
Ohara

(10) Patent No.: US 12,154,731 B2
(45) Date of Patent: Nov. 26, 2024

(54) PUSH SWITCH AND PUSH SWITCH SYSTEM

(71) Applicant: ALPS ALPINE CO., LTD., Tokyo (JP)

(72) Inventor: Hiroshi Ohara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 115 days.

(21) Appl. No.: 18/058,977

(22) Filed: Nov. 28, 2022

(65) Prior Publication Data

US 2023/0086523 A1 Mar. 23, 2023

Related U.S. Application Data

(63) Continuation of application No. PCT/JP2021/017519, filed on May 7, 2021.

(30) Foreign Application Priority Data

Jun. 4, 2020 (JP) ................................ 2020-097730

(51) Int. Cl.
*H01H 13/20* (2006.01)
*H01H 13/04* (2006.01)
*H01H 13/14* (2006.01)

(52) U.S. Cl.
CPC ............ *H01H 13/20* (2013.01); *H01H 13/04* (2013.01); *H01H 13/14* (2013.01)

(58) Field of Classification Search
CPC ........ H01H 13/10; H01H 13/04; H01H 13/14; H01H 13/50; H01H 2215/004;
(Continued)

(56) References Cited

U.S. PATENT DOCUMENTS 3,996,429 A * 12/1976 Chu ....................... H01H 13/66 200/275
2003/0209418 A1* 11/2003 Yanai ..................... H01H 13/48 200/406
(Continued)

FOREIGN PATENT DOCUMENTS

JP S62-157026 U 10/1987
JP 2003-338231 11/2003
(Continued)

OTHER PUBLICATIONS

International Search Report for PCT/JP2021/017519 mailed on Aug. 3, 2021.

*Primary Examiner* — Ahmed M Saeed
(74) *Attorney, Agent, or Firm* — IPUSA, PLLC

(57) ABSTRACT

A push switch includes a movable contact member, a first fixed contact, and a second fixed contact. The push switch is in a first contact state in a first contact position where the movable contact member contacts the first fixed contact, and is in a second contact state in a second contact position where the movable contact member contacts the second fixed contact. The push switch is not switched to an on state in response to transitioning from an off state to the first contact state, and is switched to the on state in response to further transitioning to the second contact state, and the push switch is not switched from the on state to the off state in response to the second contact state being released, and is switched from the on state to the off state in response to the first contact state being further released.

10 Claims, 10 Drawing Sheets

(58) Field of Classification Search
CPC .... H01H 13/702; H01H 13/64; H01H 13/785; H01H 13/00; H01H 13/48; H01H 13/7006; H01H 2011/0075; H01H 2201/036; H01H 2025/048; H01H 2221/012; H01H 25/008; H01H 25/041
See application file for complete search history.

(56) References Cited

U.S. PATENT DOCUMENTS

| | | | | |
|---|---|---|---|---|
| 2007/0184877 | A1* | 8/2007 | In | G06F 3/023 455/565 |
| 2014/0110237 | A1 | 4/2014 | Enomoto et al. | |
| 2021/0183593 | A1 | 6/2021 | Ohara et al. | |

FOREIGN PATENT DOCUMENTS

| | | |
|---|---|---|
| JP | 2006-216329 | 8/2006 |
| JP | 2014-099398 | 5/2014 |
| WO | 2020/050122 | 3/2020 |

* cited by examiner

PUSH SWITCH AND PUSH SWITCH SYSTEM

CROSS-REFERENCE TO RELATED APPLICATIONS

This application is a continuation of International Application No. PCT/JP2021/017519, filed on May 7, 2021 and designating the U.S., which claims priority to Japanese Patent Application No. 2020-097730, filed on Jun. 4, 2020. The contents of these applications are incorporated herein by reference in their entirety.

BACKGROUND OF THE INVENTION

1. Field of the Invention

The disclosure herein relates to a push switch and a push switch system.

2. Description of the Related Art

Conventionally, a movable contact including a first leaf spring and a second leaf spring having an elastic force greater than that of the first leaf spring is known. The entire movement stroke of the movable contact includes a first movement stroke in which the second leaf spring is tilted in response to the bending of the first leaf spring, and a second movement stroke in which the second leaf spring is moved in response to the bending of the second leaf spring (see Patent Document 1, for example).

It is difficult to stably and continuously press (press and hold) such a conventional movable contact while maintaining the on state of a switch. RELATED-ART DOCUMENTS

PATENT DOCUMENTS

Patent Document 1: Japanese Laid-open Patent Publication No. 2006-216329

SUMMARY OF THE INVENTION

It is desirable to provide a push switch capable of being stably pressed and held, and a push switch system.

According to an embodiment of the present disclosure, a push switch includes a movable contact member that is deformable and has a spring characteristic; a first fixed contact member that includes a first fixed contact configured to be contacted with and separated from the movable contact member; and a second fixed contact member that includes a second fixed contact configured to be contacted with and separated from the movable contact member. The push switch is in a first contact state in a first contact position where the movable contact member contacts the first fixed contact in response to the movable contact member being pressed by a pressing operation, and the push switch is in a second contact state in a second contact position where the movable contact member contacts the second fixed contact in response to the movable contact member being further pressed by the pressing operation. The push switch is not switched to an on state in response to transitioning from an off state to the first contact state, and is switched to the on state in response to further transitioning to the second contact state, and the push switch is not switched from the on state to the off state in response to the second contact state being released, and is switched from the on state to the off state in response to the first contact state being further released.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

In the following, a push switch and a push switch system according to embodiments of the present invention will be described with reference to the accompanying drawings.

First Embodiment

Figure 1:
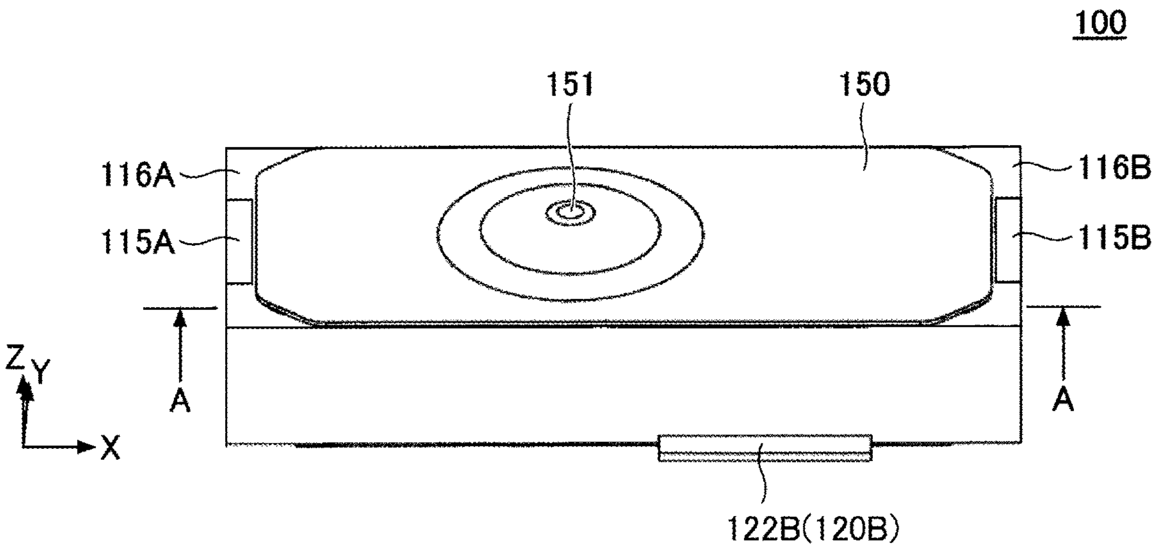
FIG. 1 is a perspective view of a push switch 100 according to a first embodiment.
Figure 2:
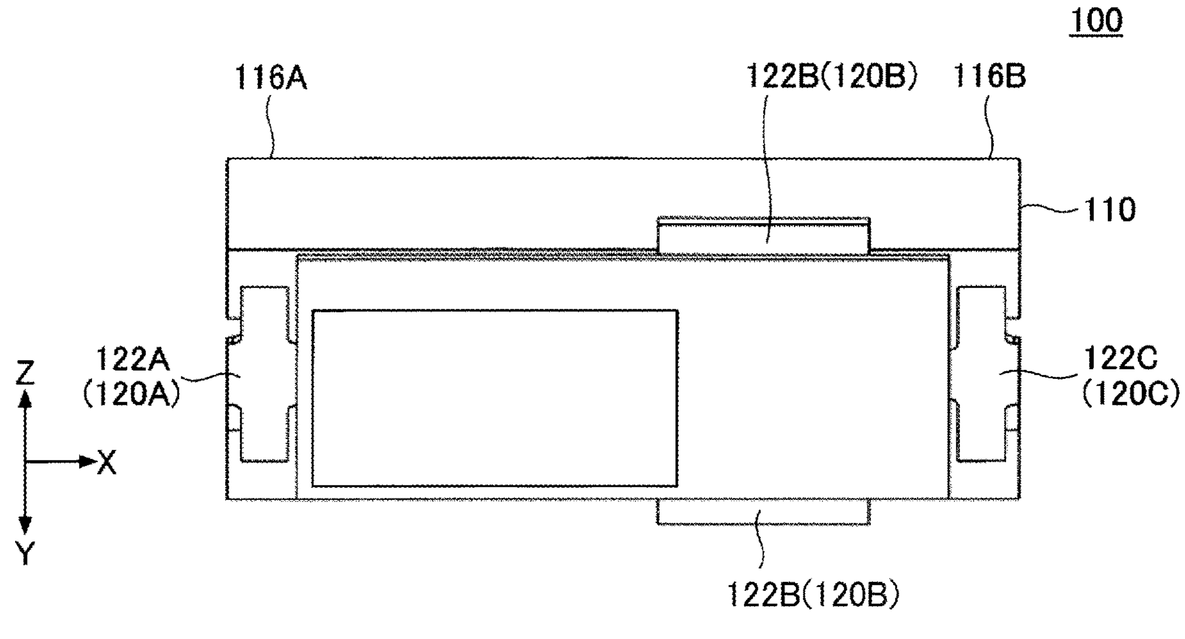
FIG. 2 is a perspective view of the push switch 100.
Figure 3:
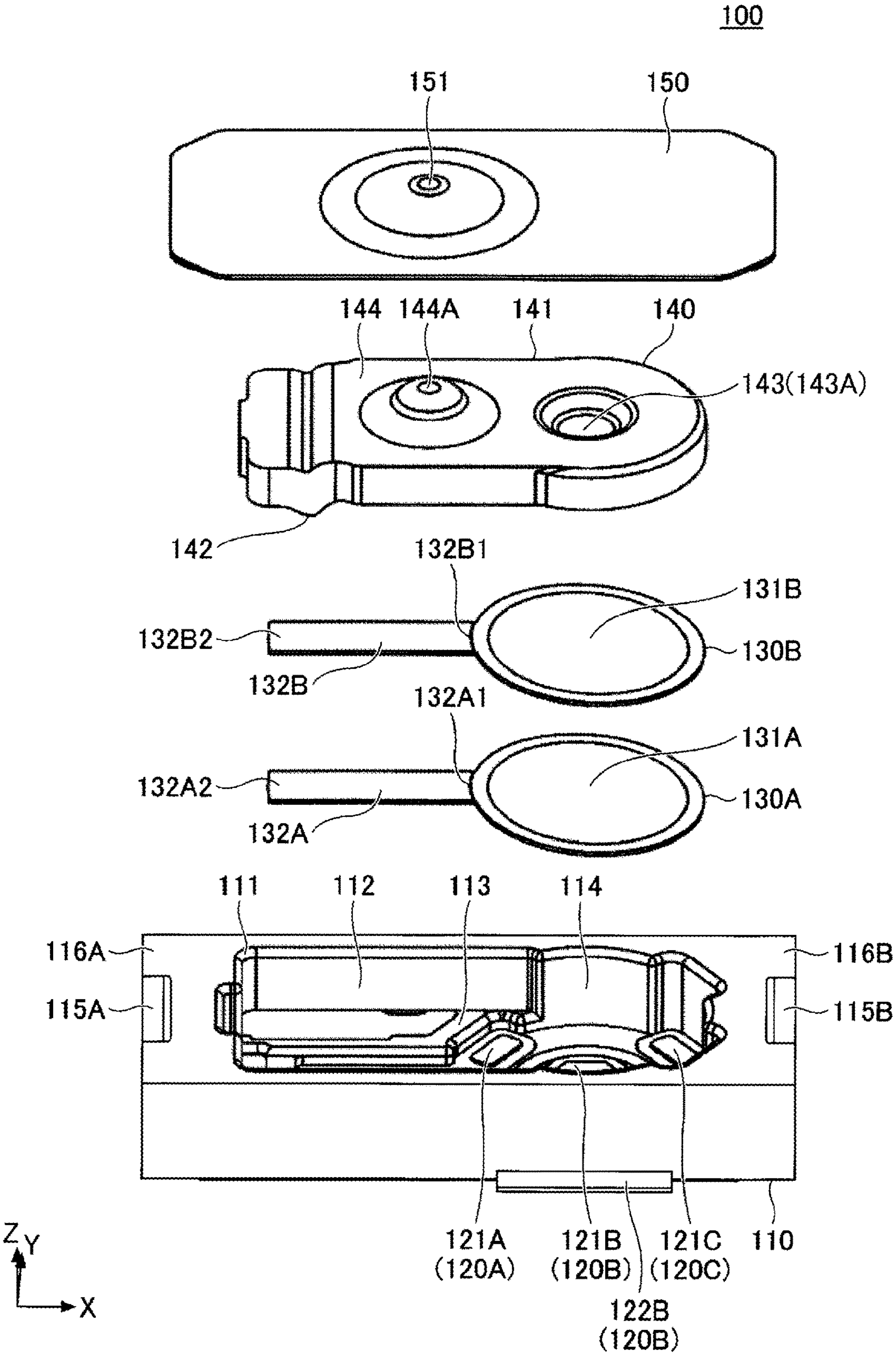
FIG. 3 is an exploded view of the push switch 100.

FIG. 1 and FIG. 2 are perspective views of a push switch 100 according to a first embodiment. FIG. 3 is an exploded view of the push switch 100. In the following, an XYZ Cartesian coordinate system is used for description. Further, for convenience of description, −Z side is referred to as a lower side or a bottom, and +Z side is referred to as an upper side or a top, but this positional relationship does not represent a universal relationship.

The push switch 100 includes a housing 110, metal plates 120A, 120B, and 120C, a metal contact 130A, a leaf spring 130B, a pressing member 140, and an insulator 150.

Figure 4:
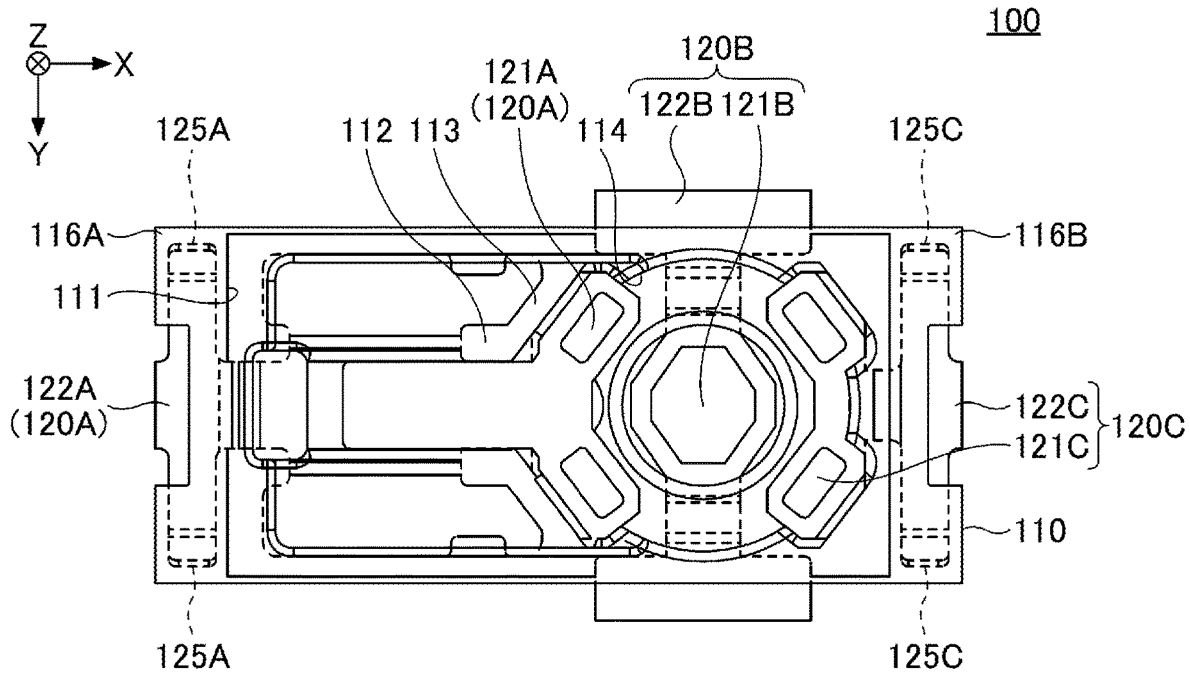
FIG. 4 is a drawing transparently illustrating metal plates 120A, 120B, and 120C embedded in a housing 110 by insert molding.
Figure 5:
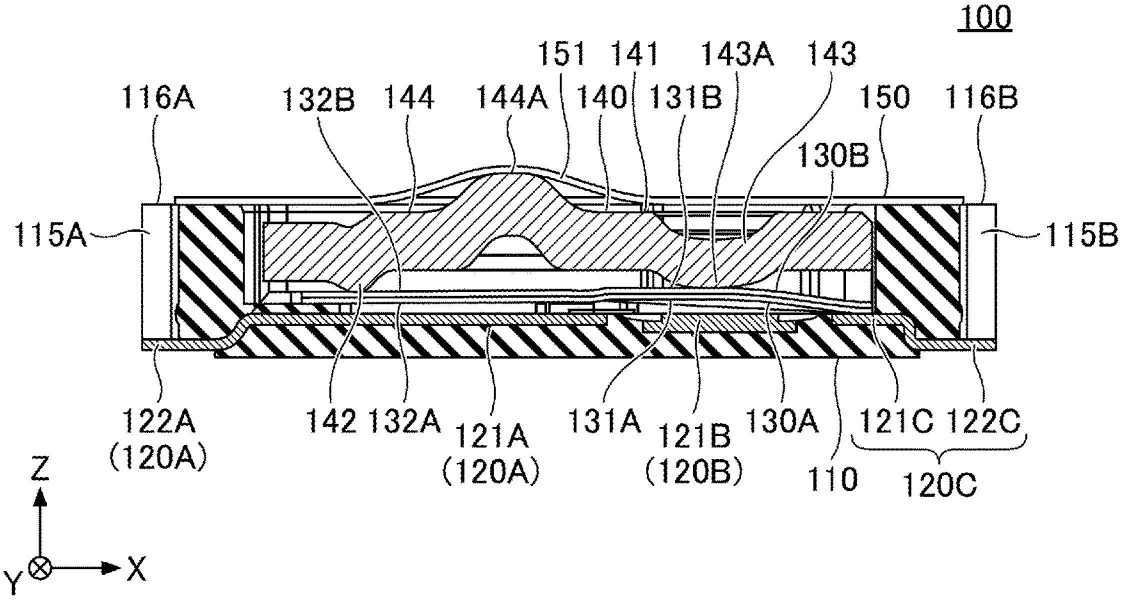
FIG. 5 is a drawing illustrating the cross-sectional structure and the operation of the push switch 100.
Figure 6:
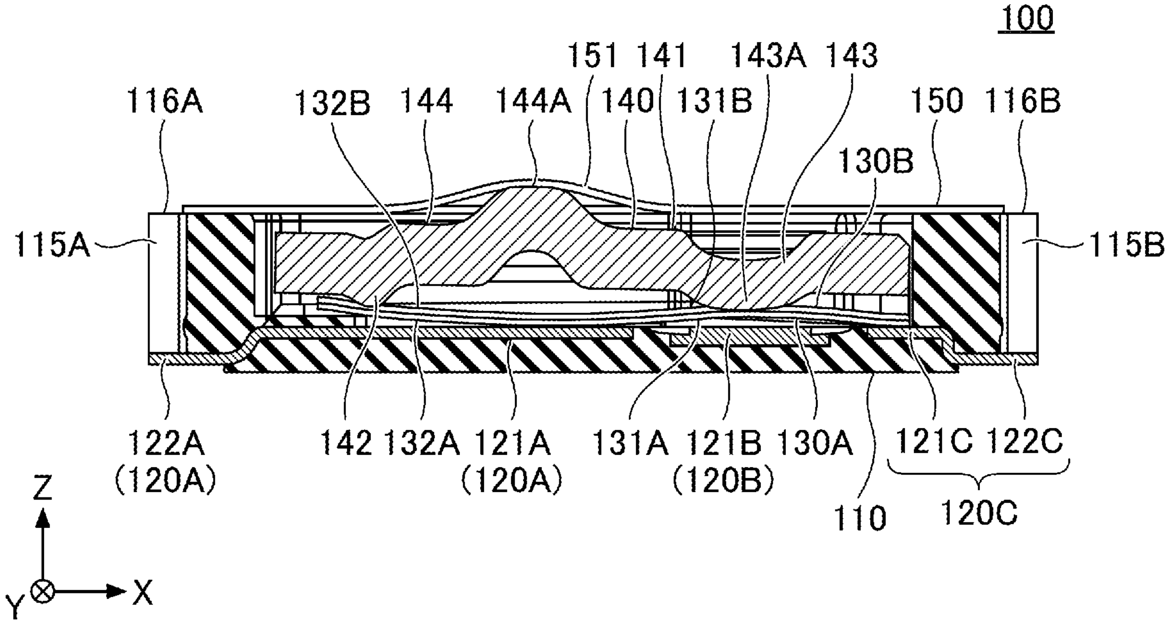
FIG. 6 is a drawing illustrating the cross-sectional structure and the operation of the push switch 100.
Figure 7:
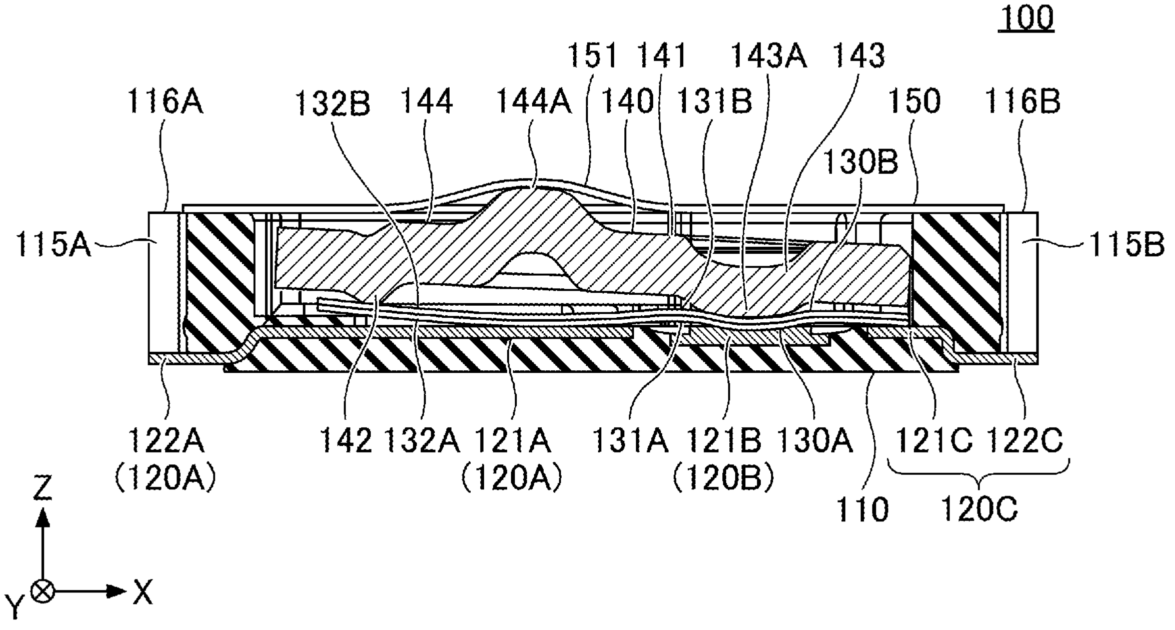
FIG. 7 is a drawing illustrating the cross-sectional structure and the operation of the push switch 100.

In the following, the metal plates 120A, 120B, and 120C will be described with reference to not only FIG. 1, FIG. 2, and FIG. 3, but also FIG. 4. FIG. 4 is a drawing transparently illustrating the metal plates 120A, 120B, and 120C embedded in the housing 110 by insert molding. FIG. 4 is a drawing transparently illustrating the metal plates 120A, 120B, and 120C embedded in the housing 110 by insert molding. The cross-sectional structure and the operation of the push switch 100 will be described with reference to FIG. 5 through FIG. 7 illustrating cross-sections of the push switch 100 taken through A-A of FIG. 1. Each of the cross-sections taken through A-A is a cross-section taken along the XZ plane passing through the center of the push switch 100 in the Y direction. The push switch 100 has, for example, a shape in which the length in the X direction is greater than the length in the Y direction. Therefore, each of the housing 110, the pressing member 140, and the insulator 150 also has a shape in which the length in the X direction is greater than the length in the Y direction.

In the following, with respect to the push switch 100, the housing 110, the pressing member 140, and the insulator 150, the X direction is the longitudinal direction, and the Y direction is the transverse direction. The X direction is an example of a first axial direction, and the Y direction is an example of a second axial direction. An end portion of the housing 110 in the –X direction is an example of a first end portion in the first axial direction, and an end portion of the housing 110 in the +X direction is an example of a second end portion in the first axial direction.

When the push switch 100 is off (in an electrically disconnected state), the metal contact 130A contacts the metal plate 120C (a peripheral fixed contact 121C), and does not contact the metal plate 120A (a peripheral fixed contact 121A) and the metal plate 120B (a central fixed contact 121B). That is, the metal plates 120A and 120B are not electrically connected to the metal plate 120C. Pressing the insulator 150 down causes the metal contact 130A to be pressed down via the pressing member 140 and the leaf spring 130B. As a result, the metal contact 130A and the leaf spring 130B become inverted, thus causing the metal plates 120A and 120B to be electrically connected to the metal plate 120C through the metal contact 130A in a stepwise manner. The push switch 100 is not switched to an on state in response to the metal plate 120A being connected to the metal plate 120C. The push switch 100 is switched to the on state (an electrically connected state) in response to the metal plate 120B being connected to the metal plate 120C. An external controller determines the on-off state of the push switch 100.

A stroke for pressing the insulator 150 in order to cause the metal contact 130A to contact the metal plate 120B is 0.05 mm, which is very short. Further, an operating load required to invert the metal contact 130A is 3.3 N, for example. This operating load is sufficient to prevent the push switch 100 from being turned on if the insulator 150 is accidentally touched. That is, this operating load is sufficient to reduce misoperation.

The housing 110 is made of a resin, and holds the metal plates 120A, 120B, and 120C. The housing 110 and the metal plates 120A, 120B, and 120C are integrally formed by insert molding. In other words, the metal plates 120A, 120B, and 120C are embedded in the housing 110 by insert molding. The housing 110 has an opening 111 and a compartment 112 in communication with the opening 111. The opening 111 is formed in the surface on +Z side of the housing 110. The housing 110 has a bottom wall 113 and a side wall 114. The bottom wall 113 is a plate-shaped portion provided on the bottom of the housing 110. The side wall 114 is a side wall extending upward from the outer peripheral edge of the bottom wall 113. The compartment 112 is a space surrounded by the bottom wall 113 and the side wall 114.

The housing 110 has recesses 115A and 115B in both ends in the X direction. The recess 115A is an example of a first recess and is recessed in the +X direction. The recess 115B is an example of a second recess and is recessed in the –X direction. The recesses 115A and 115B are recessed in the X direction by the same length, and the recesses 115A and 115B have the same length in the Y direction. Further, the recesses 115A and 115B are at the same position in the Y direction.

In the following, portions of the bottom wall 113 and the side wall 114, situated in the four corners of the housing 110 in a plan view, are referred to as corner portions 116A and 116B. The corner portions 116A are situated on both ends on the –X side and in the Y direction of the housing 110. The corner portions 116A protrude toward the –X side with respect to the recess 115A. The corner portions 116B are situated on both ends on the +X side and in the Y direction of the housing 110. The corner portions 116B protrude toward the +X side with respect to the recess 115B.

The compartment 112 extends downward from the opening 111. The peripheral fixed contact 121A of the metal plate 120A, the central fixed contact 121B of the metal plate 120B, and the peripheral fixed contact 121C of the metal plate 120C are disposed at the bottom of the compartment 112, and are exposed in the compartment 112. The leaf spring 130B is stacked on the metal contact 130A, and the metal contact 130A and the leaf spring 130B are disposed over the peripheral fixed contact 121A, the central fixed contact 121B, and the peripheral fixed contact 121C within the compartment 112 (see FIG. 3 and FIG. 5). The pressing member 140 is disposed on the leaf spring 130B.

The bottom wall 113 is a portion at the bottom of the housing 110, and is a rectangular plate-shaped portion in a plan view. The bottom wall 113 holds the metal plates 120A, 120B, and 120C. The upper surfaces of the peripheral fixed contact 121A of the metal plate 120A, the central fixed contact 121B of the metal plate 120B, and the peripheral fixed contact 121C of the metal plate 120C are exposed from the bottom wall 113.

The side wall 114 is provided along the outer peripheral edge of the bottom wall 113, and extends upward from a portion of the bottom wall 113 that is outside the compartment 112. Extension portions 125A and 125C of the metal plates 120A and 120C are embedded in portions at the four corners between the side wall 114 and the bottom wall 113.

The metal plate 120A is an example of a first fixed contact member, and includes the peripheral fixed contact 121A, a terminal 122A, and the extension portions 125A. The metal plate 120A may be made of copper, for example. The peripheral fixed contact 121A is an example of a first fixed contact. The peripheral fixed contact 121A does not contact the metal contact 130A in a state in which the insulator 150 is not pressed down (see FIG. 5), and contacts the metal contact 130A in a state in which the insulator 150 is pressed down to a first level (see FIG. 6). The terminal 122A protrudes toward the –X side within the recess 115A of the housing 110.

The extension portions 125A are an example of a pair of first extension portions, and are portions extending obliquely upward that are formed by upwardly bending both ends of the terminal 122A extending in the Y direction. The extension portions 125A are embedded in the lower sides, in the thickness direction, of the corner portions 116A of the housing 110. The extension portions 125A are provided in the corner portions 116A so as to extend across the bottom wall 113 and the side wall 114.

The metal plate 120B is an example of a second fixed contact member, and includes the central fixed contact 121B and two terminals 122B. The metal plate 120B may be made of copper, for example. The central fixed contact 121B is an example of a second fixed contact. The central fixed contact 121B does not contact the metal contact 130A in a state in which the insulator 150 is not pressed down (see FIG. 5), and contacts the metal contact 130A in a state in which the insulator 150 is pressed down to a second level (see FIG. 7). The two terminals 122B are provided on the +Y and −Y sides of the central fixed contact 121B, and protrude from the lower sides of the housing 110 in the +Y and −Y directions.

The metal plate 120C is an example of a third fixed contact member, and includes the peripheral fixed contact 121C, a terminal 122C, and extension portions 125C. The metal plate 120C may be made of copper, for example. The peripheral fixed contact 121C is an example of a third fixed contact. The peripheral fixed contact 121C contacts an end portion on the +X side of the metal contact 130A in a state in which the insulator 150 is not pressed down (see FIG. 5). The peripheral fixed contact 121C also contacts the end portion on the +X side of the metal contact 130A in a state in which the insulator 150 is pressed down to the first level (see FIG. 6) and when the insulator 150 is pressed down to the second level (see FIG. 7). That is, the peripheral fixed contact 121C contacts the end portion on the +X side of the metal contact 130A at all times. The terminal 122C protrudes toward the +X side within the recess 115B of the housing 110.

The extension portions 125C are an example of a pair of second extension portions, and are portions extending obliquely upward that are formed by upwardly bending both ends of the terminal 122C extending in the Y direction. The extension portions 125C are embedded in the lower sides, in the thickness direction, of the corner portions 116B of the housing 110. The extension portions 125C are provided in the corner portions 116B so as to extend across the bottom wall 113 and the side wall 114.

The extension portions 125A and 125C are provided so as to improve the rigidity of the entire push switch 100 by reinforcing the corner portions 116A and 116B of the housing 110. The extension portions 125A and the terminal 122A are provided substantially along the entirety of one side of the housing 110 in the Y direction, and have a shape such that both ends of the terminal 122A extending in the Y direction are bent upward. Likewise, the extension portions 125C and the terminal 122C are provided substantially along the entirety of the other side of the housing 110 in the Y direction, and have a shape such that both ends of the terminal 122C extending in the Y direction are bent upward. Therefore, the extension portions 125A and 125C are situated in the four corners of the housing 110 in a plan view, and are situated in the lower sides, in the thickness direction, of the corner portions 116A and 116B.

As described above, the extension portions 125A and 125C, formed by upwardly bending both ends of the terminals 122A and 122C extending in the Y direction, are embedded in the corner portions 116A and 116B of the housing 110. Accordingly, even if the housing 110 receives stress from above, because the extension portions 125A and 125C made of metal are present, the rigidity of the housing 110 can be remarkably improved. In particular, the rigidity of the corner portions 116A and 116B of the housing 110 can be remarkably improved. Accordingly, the flexural rigidity of the push switch 100 when the push switch 100 is twisted in the longitudinal direction can be remarkably improved.

This kind of reinforcement would not be achieved by a conventional switch that includes extension portions extending toward the +X side from both ends of a terminal 122A extending in the Y direction and extension portions extending toward the −X side from both ends of a terminal 122C extending in the Y direction. This is because the conventional switch does not include extension portions in corner portions 116A and 116B of a housing 110. The conventional switch is suitable for an application in which less strength is required. However, for an application in which higher strength is required, a configuration in which the extension portions 125A and 125C are embedded in the corner portions 116A and 116B of the housing 110 is effective.

In a configuration such as that of the conventional switch that includes the extension portions extending toward the +X side from both ends of the terminal 122A extending in the Y direction and the extension portions extending toward the −X side from both ends of the terminal 122C extending in the Y direction, the extension portions are bent toward compartment 112. Therefore, the volume of the compartment 112 would decrease.

Conversely, in the push switch 100 according to the embodiment, the extension portions 125A and 125C are embedded in the corner portions 116A and 116B of the housing 110. Therefore, the extension portions 125A and 125C are situated inside the corner portions 116A and 116B, that is, inside the portions of the bottom wall 113 and the side wall 114. Accordingly, providing the extension portions 125A and 125C does not affect the size of the compartment 112.

In a case where the pressing member 140 that utilizes the principle of leverage is included, an increase in the length in the X direction of the compartment 112 results in a larger ratio of the length between the fulcrum and the load to the length between the fulcrum and the effort in accordance with the principle of leverage. From this standpoint, it is effective to provide the extension portions 125A and 125C, formed by upwardly bending both ends of the terminals 122A and 122C extending in the Y direction, in the corner portions 116A and 116B of the housing 110.

Further, the terminals 122A and 122C are accommodated in spaces of the recesses 115A and 115B of the housing 110. Therefore, the length of the push switch 100 in the X direction can be reduced.

Note that, in the present embodiment, the extension portions 125A and 125C are provided in the corner portions 116A and 116B of the housing 110 so as to extend across the bottom wall 113 and the side wall 114; however, the extension portions 125A and 125C may be provided in corner portions 116A and 116B of either the bottom wall 113 or the side wall 114. For example, in a case where the bottom wall 113 is relatively thick, the extension portions 125A and 125C may be provided in the bottom wall 113 only. For example, in a case where the bottom wall 113 is relatively thin, the extension portions 125A and 125C may be provided in the side wall 114 only. That is, the extension portions 125A and 125C may be provided in corner portions 116A and 116B of one or both of the bottom wall 113 and the side wall 114.

The metal contact 130A is an example of a movable contact member, and is a metal spring implemented by a metal member. The metal contact 130A includes a dome 131A and a leg portion 132A (see FIG. 3). The dome 131A is situated at the center of the metal contact 130A, protrudes upward in a dome shape, and is invertible. The leg portion 132A extends in the −X direction from the end on the −X side of the dome 131A. The dome 131A is an example of a dome-shaped spring portion. The leg portion 132A includes a connection portion 132A1 and an end portion 132A2. The connection portion 132A1 is a portion where the dome 131A and the leg portion 132A are connected. The connection portion 132A1 includes not only a boundary portion between the dome 131A and the leg portion 132A, but also an outer peripheral portion of the dome 131A and an end portion on the +X side of the leg portion 132A. The end portion 132A2 is an end portion on the −X side of the leg portion 132A. For example, the metal contact 130A may be made of stainless steel. The end portion 132A2 is an example of a fixed portion. An end portion 132B2 of the leaf spring 130B is placed on the end portion 132A2, and in this state, the end portion 132A2 is sandwiched and fixed between the bottom wall 113 of the housing 110 and a fulcrum portion 142 of the pressing member 140. Note that the end portion 132A2 may be embedded and fixed in the side wall 114 of the housing 110 by insert molding.

Upon the insulator 150 being pressed down to the first level (see FIG. 6), the connection portion 132A1 is pressed down and contacts the peripheral fixed contact 121A of the metal plate 120A. In this state, the metal contact 130A causes the peripheral fixed contact 121A to be electrically connected to the peripheral fixed contact 121C. The position of the metal contact 130A at this time is an example of a first contact position, and a state in which the metal contact 130A causes the peripheral fixed contact 121A to be electrically connected to the peripheral fixed contact 121C is an example of a first contact state.

Upon the insulator 150 being pressed down to the second level (see FIG. 7), the dome 131A is inverted and projects downward (see FIG. 7). In this state, the dome 131A of the metal contact 130A contacts the central fixed contact 121B and causes the central fixed contact 121B to be electrically connected to the peripheral fixed contact 121C. The position of the metal contact 130A at this time is an example of a second contact position, and a state in which the metal contact 130A causes the central fixed contact 121B to be electrically connected to the peripheral fixed contact 121C is an example of a second contact state. In this state, the metal contact 130A maintains the electrically connected state between the peripheral fixed contact 121A and the peripheral fixed contact 121C.

The lower surface of the metal contact 130A is silver-plated. This is because the lower surface of the metal contact 130A contacts the central fixed contact 121B and the peripheral fixed contact 121C through which the current flows. In addition, the inversion of the dome 131A can provide an operating sensation to an operator.

The metal contact 130A is made by punching a circular portion of a metal plate to form the dome 131A. The metal plate includes the circular portion and an elongated portion that corresponds to the leg portion 132A in a plan view.

The leaf spring 130B has the same configuration as that of the metal contact 130A, except that silver plating is not applied to the leaf spring 130B. The leaf spring 130B includes a dome 131B and a leg portion 132B. The leg portion 132B includes a connection portion 132B1 and the end portion 132B2, which correspond to the connection portion 132A1 and the end portion 132A2 of the leg portion 132A of the metal contact 130A, respectively.

The pressing member 140 is housed in the compartment 112. The insulator 150 is bonded to the upper surface of the housing 110, and thus, the pressing member 140 is not displaced in the compartment 112 (FIG. 5). The pressing member 140 is a metal member having a flat plate shape (see FIG. 3). The pressing member 140 includes a body portion 141, the fulcrum portion 142 (an example of a first fulcrum portion), a load portion 143 (an example of a first load portion), and an effort portion 144 (an example of a first effort portion). The pressing member 140 can function as a lever, and the fulcrum portion 142, the load portion 143, and the effort portion 144 function as the fulcrum, the load, and the effort of a lever. The pressing member 140 may be made by processing a metal plate. For example, the pressing member 140 may be made of stainless steel.

Because the pressing member 140 utilizes the principle of leverage, the pressing member 140 needs to have low bendability and relatively high rigidity. For this reason, the pressing member 140 is composed of metal, and is relatively wide in the Y-axis direction and relatively thick in the Z-axis direction.

The body portion 141 has a shape in which the fulcrum portion 142 and the load portion 143 are curved downward with respect to the effort portion 144 such that the load portion 143 can be easily displaced downward.

The fulcrum portion 142 is provided on the −X side, and the end portion 132A2 of the leg portion 132A of the metal contact 130A and the end portion 132B2 of the leg portion 132B of the metal contact 130A are sandwiched between the fulcrum portion 142 and the bottom surface of the compartment 112. The fulcrum portion 142 has a sufficiently large width in the Y direction. Therefore, the fulcrum portion 142 is not readily tilted in the Y direction when the pressing member 140 is moved, thereby allowing a force to be efficiently transmitted to the leaf spring 130B and the metal contact 130A. In the present embodiment, the fulcrum portion 142 extends along the entire width in the Y direction of the pressing member 140, but the fulcrum portion 142 may be divided into several portions.

The fulcrum portion 142 protrudes in the −Z direction. The fulcrum portion 142 protruding in the −Z direction allows the pressing member 140 to be separated from the bottom surface of the compartment 112 in the +Z direction. Accordingly, the pressing member 140 can be readily moved.

The load portion 143 is disposed on the +X side, and includes a projection 143A (an example of a first projection) configured to press the metal contact 130A. As illustrated in FIG. 3, the projection 143A has a truncated cone shape and a flat lower surface. In a plan view, the projection 143A has a circular shape.

The projection 143A is disposed in contact with the upper surface of the leaf spring 130B. The pressing member 140 utilizes the principle of leverage to cause the load portion 143 to be pressed down, thereby pressing the leaf spring 130B and the metal contact 130A down. Upon the insulator 150 being pressed down to the first level (see FIG. 6), the connection portion 132A1 of the metal contact 130A contacts the peripheral fixed contact 121A. In this state, the domes 131B and 131A of the leaf spring 130B and the metal contact 130A, respectively, are not inverted, and the metal contact 130A does not contact the central fixed contact 121B.

Upon the insulator 150 being further pressed down to the second level (see FIG. 7), the domes 131B and 131A of the leaf spring 130B and the metal contact 130A, respectively, are inverted, and the metal contact 130A contacts the central fixed contact 121B. When the insulator 150 is pressed down from the first level (see FIG. 6) to the second level (see FIG. 7), the connection portion 132A1 of the metal contact 130A remains in contact with the peripheral fixed contact 121A.

The effort portion 144 is provided between the fulcrum portion 142 and the load portion 143, and includes a projection 144A. The projection 144A protrudes in a hemispherical shape. When the insulator 150 is not pressed, the projection 144A does not contact the insulator 150 and there is a space between the projection 144A and the insulator 150. However, upon the insulator 150 being pressed down, the insulator 150 contacts the projection 144A and presses the projection 144A down. In this state, the force is applied to the effort of the pressing member 140 that utilizes the principle of leverage.

The insulator 150 is made of a resin sheet, is bonded to the upper surface of the housing 110, and covers the opening 111. The insulator 150 includes a protrusion 151 at a position offset in the −X direction from the center thereof in a plan view (see FIG. 1, FIG. 2, and FIG. 4). The protrusion 151 is formed by heating the resin sheet.

The metal plates 120A, 120B, and 120C, the metal contact 130A, the leaf spring 130B, and the pressing member 140 are housed in the compartment 112 of the housing 110, and the insulator 150 is bonded to the housing 110. By bonding the insulator 150 to the housing 110, the metal plates 120A, 120B, and 120C, the metal contact 130A, the leaf spring 130B, and the pressing member 140 can be held in the compartment 112 without looseness.

The protrusion 151 is disposed at a position that overlaps with the effort portion 144 in a plan view, and is bendable and deformable so as to contact the effort portion 144 (see FIG. 7). When the protrusion 151 is not bent and deformed as illustrated in FIG. 5, the protrusion 151 is spaced apart from the effort portion 144.

Figure 8:
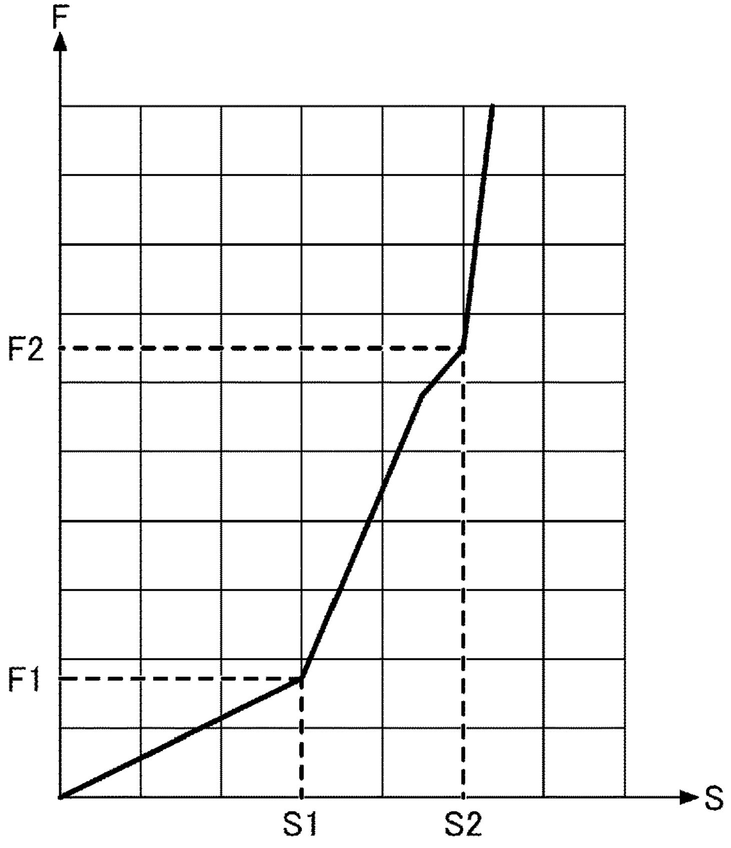
FIG. 8 is a graph indicating force-stroke (FS) characteristics of the push switch 100.

FIG. 8 is a graph indicating force-stroke (FS) characteristics of the push switch 100. The horizontal axis represents a stroke (S) for pressing the insulator 150 down, and the vertical axis represents a force (F) required to press the insulator 150 down. The force (F) corresponds to the operating load.

As illustrated in FIG. 8, when the insulator 150 is pressed down from a zero-stroke position, the operating load gradually increases until the stroke reaches S1. During this time, the operating load is very small. The level at which the stroke for pressing the insulator 150 reaches S1 is the first level (see FIG. 6). A range from the zero-stroke position to S1 is an operating range in which the insulator 150 presses the projection 144A of the effort portion 144, the domes 131A and 131B of the metal contact 130A and the leaf spring 130B, respectively, are pressed by the load portion 143, the leg portions 132A and 132B are bent from the state illustrated in FIG. 5 to the state illustrated in FIG. 6, and the connection portion 132A1 contacts the peripheral fixed contact 121A. This indicates that the operating load required to bend the leg portions 132A and 132B is very small.

For example, S1 may be 0.03 mm. The push switch 100 may include a button on the insulator 150. The button may be a push button switch used in a vehicle, a push button switch used in an electronic device, or any button that is actually pressed.

For example, in the case of a product that is easily subjected to vibrations, such as a portable device, if there is a gap between an insulator 150 and a button, a vibration applied to the product would be transmitted to the button, and as a result, noise would be generated. In such a case, the noise may be reduced by pressing the button against another component while the product is not in operation. For example, the button may be attached to the insulator 150 while slightly pressing (pre-tensioning) the insulator 150 so as to avoid a gap between the button and the insulator 150. In this state, the insulator 150 is being pressed by less than the stroke S1. In this case, when the button is pressed, the stroke may start from a position less than S1 (for example, a position that is a half of S1).

Upon the stroke exceeding S1, the load portion 143 of the pressing member 140 further presses the domes 131A and 131B of the metal contact 130A and the leaf spring 130B, respectively. Upon the stroke reaching S2, the operating load becomes F2, and the metal contact 130A and the leaf spring 130B are inverted. The level at which the stroke for pressing the insulator 150 reaches S2 is the second level (see FIG. 7). In this state, the metal contact 130A contacts the central fixed contact 121B with the domes 131A and 131B being inverted. Note that in the second level (see FIG. 7), the connection portion 132A1 of the metal contact 130A remains in contact with the peripheral fixed contact 121A.

When the insulator 150 continues to be pressed after the stroke reaches S2, the stroke increases to be slightly greater than S2 because of the shrinkage of the insulator 150 or the like. At this time, because the inverted domes 131A and 131B are pressed against the central fixed contact 121B, the operating load exceeds F2.

Because the push switch 100 utilizes the principle of leverage, a stroke for pressing the insulator 150 in order to turn the push switch 100 on is less than a stroke for pressing and inverting the metal contact 130A and the leaf spring 130B alone. As used herein, pressing the metal contact 130A and the leaf spring 130B alone means pressing the metal contact 130A and the leaf spring 130B directly without using the pressing member 140.

Further, an operating load required to press the insulator 150 in order to turn the push switch 100 on is greater than an operating load required to press and invert the metal contact 130A and the leaf spring 130B alone. Accordingly, the stroke of the push switch 100 can be reduced, and also an improved operating sensation can be provided with a relatively large operating load.

Figure 9:
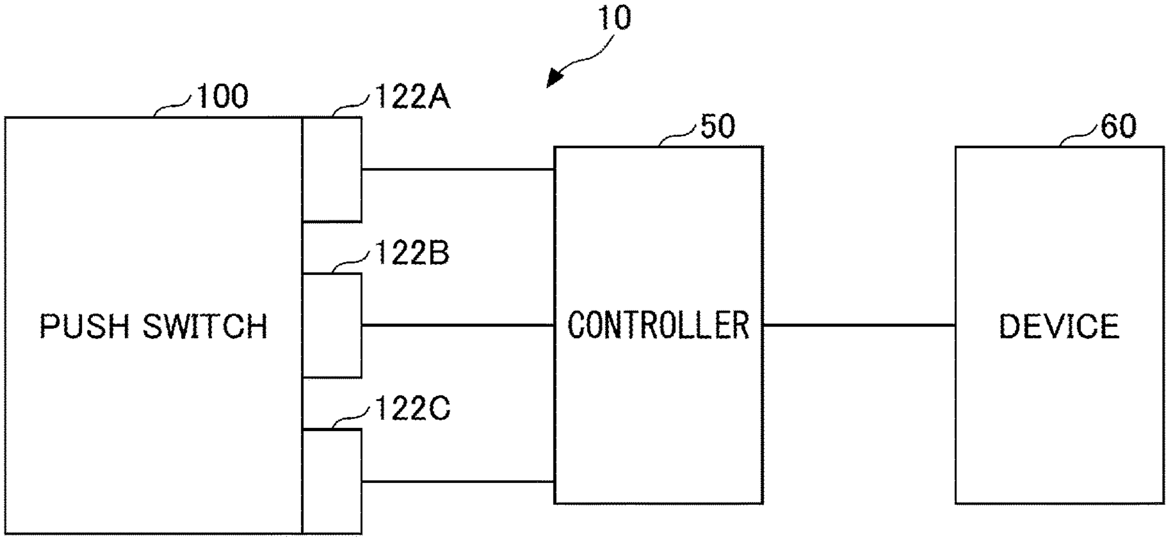
FIG. 9 is a drawing illustrating a push switch system 10.

FIG. 9 is a drawing illustrating a push switch system 10. The push switch system 10 includes a controller 50 and the push switch 100. A device 60, which is an operation target of the push switch 100, is connected to the controller 50. In FIG. 9, the illustration of the push switch 100 is simplified, and the terminals 122A, 122B, and 122C are depicted. The controller 50 is implemented by a computer including a central processing unit (CPU), a random access memory (RAM), a read only memory (ROM), an input/output interface, and an internal bus. For example, the controller 50 is a computer included in an electronic device such as an electronic control unit (ECU) of a vehicle or a portable device. The controller 50 is connected to the terminals 122A, 122B, and 122C. The device 60 can be operated by the push switch 100 via the controller 50.

The controller 50 can detect a state in which the terminals 122A and 122B are not connected to the terminal 122C, a state in which the terminal 122A is connected to the terminal 122C and the terminal 122B is not connected to the terminal 122C, and a state in which the terminal 122A is connected to the terminal 122C and the terminal 122B is connected to the terminal 122C based on resistance values of the terminals 122A, 122B, and 122C.

The state in which the terminals 122A and 122B are not connected to the terminal 122C is an electrically disconnected state in which the terminals 122A and 122B are not electrically connected to the terminal 122C. The state in which the terminal 122A is connected to the terminal 122C and the terminal 122B is not connected to the terminal 122C is an example of the first contact state. Further, the state in which the terminal 122A is connected to the terminal 122C and the terminal 122B is connected to the terminal 122C is an example of the second contact state.

The controller 50 determines that the push switch 100 is off (in an off state) when the push switch 100 is in an electrically disconnected state. The controller 50 determines that the push switch 100 is off (in the off state) even when the push switch 100 transitions from the electrically disconnected state to the first contact state. The controller 50 determines that the push switch 100 is on (in an on state) when the push switch 100 transitions from the electrically disconnected state via the first contact state to the second contact state.

Further, the controller 50 determines that the push switch 100 is on (in the on state) even when the push switch 100, which is in the on state, transitions from the second contact state (on state) to the first contact state. The controller 50 determines that the push switch 100 is off (in the off state) when the push switch 100, which is in the on state, transitions from the first contact state (on state) to the electrically disconnected state (off state).

Therefore, upon a user pressing the insulator 150 and the push switch 100 transitions to the second contact state, the controller 50 determines that the push switch 100 is turned on and thus turns the device 60 on, which is the operation target of the push switch 100. Even if the force pressing the insulator 150 is weakened and the stroke falls below S2, the controller 50 determines that the push switch 100 is on as long as the stroke does not fall below S1 and the first contact state is maintained. Thus, the controller 50 maintains the device 60 on. Upon the stroke falling below S1, the controller 50 determines that the push switch 100 is turned off and thus turns the device 60 off.

As described above, in order to turn the device 60 on, which is the operation target of the push switch 100, by using the push switch 100, the insulator 150 needs to be pressed until the stroke reaches S2. Even when the stroke returns to S1 while the device 60 is on, the device 60 remains on. Upon the stroke falling below S1, the device 60 is turned off.

That is, even when the stroke returns to S1 while the device 60 is on, the on-state of the device 60 can be maintained. Therefore, the user can stably press and hold the push switch 100 (the insulator 150) for a long period of time.

Accordingly, the push switch 100 capable of being stably pressed and held, and the push switch system 10 can be provided.

Further, the extension portions 125A and 125C, formed by upwardly bending both ends of the terminals 122A and 122C extending in the Y direction, are provided in the corner portions 116A and 116B of the housing 110. Therefore, the length of the compartment 112 in the X direction can be secured. Accordingly, in the pressing member 140, the ratio of the length between the fulcrum portion 142 and the load portion 143 to the length between the fulcrum portion 142 and the effort portion 144 can be increased.

Further, the terminals 122A and 122C are accommodated in the spaces of the recesses 115A and 115B of the housing 110, respectively. Therefore, the length of the push switch 100 in the X direction can be reduced, and the size of the push switch 100 in the longitudinal direction can be thus reduced. Accordingly, in the reduced-size push switch 100, the pressing member 140 that utilizes the principle of leverage can be effectively utilized.

In addition, by utilizing the principle of leverage, the operating load required for the push switch 100 can be readily obtained even if a metal contact 130A and a leaf spring 130B with low operating loads are used. In general, a metal contact 130A with a high operating load tends to have a longer operating life than a metal contact 130A with a low operating load. That is, the operating life of the push switch 100 can be extended.

Further, in the present embodiment, the leaf spring 130B is stacked on the metal contact 130A in order to obtain a predetermined operating load. However, if a required operating load is low, the number of stacked parts may be reduced (that is, the leaf spring 130B is not required to be provided).

Further, the pressing member 140 can be made by stamping a metal plate. Therefore, the components such as the fulcrum portion 142, the load portion 143, and the effort portion 144 can be readily formed.

In the above-described embodiment, the push switch 100 includes the pressing member 140 that utilizes the principle of leverage; however, the pressing member 140 may be configured not to utilize the principle of leverage. Specifically, instead of the pressing member 140, a pressing member that directly transmits the pressing load of the insulator 150 to the leaf spring 130B without utilizing the principle of leverage may be used. Further, the metal contact 130A and the leaf spring 130B may be configured not to be inverted, and the metal contact 130A may contact the metal plates 120A and 120B in a two-stepwise manner by a pressing operation.

Further, in the above-described embodiment, the push switch 100 includes the metal contact 130A and the leaf spring 130B; however, the push switch 100 may include the metal contact 130A only.

Further, in the above-described embodiment, the pressing member 140 includes the projection 143A and the projection 144A; however, the pressing member 140 does not necessarily include one or both of the projection 143A and the projection 144A.

Second Embodiment

Figure 10:
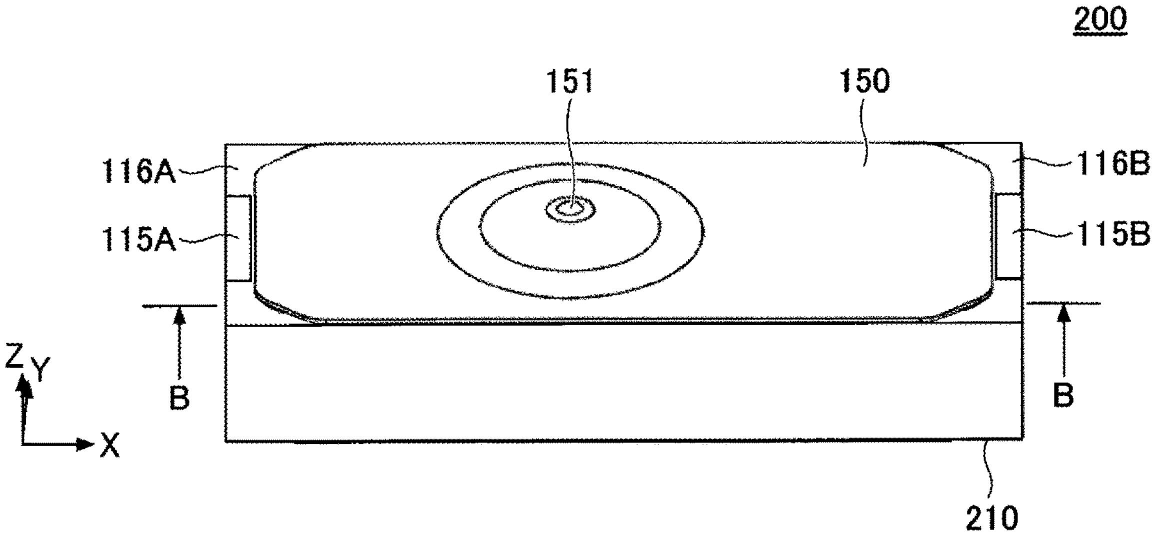
FIG. 10 is a perspective view of a push switch 200 according to a second embodiment.
Figure 11:
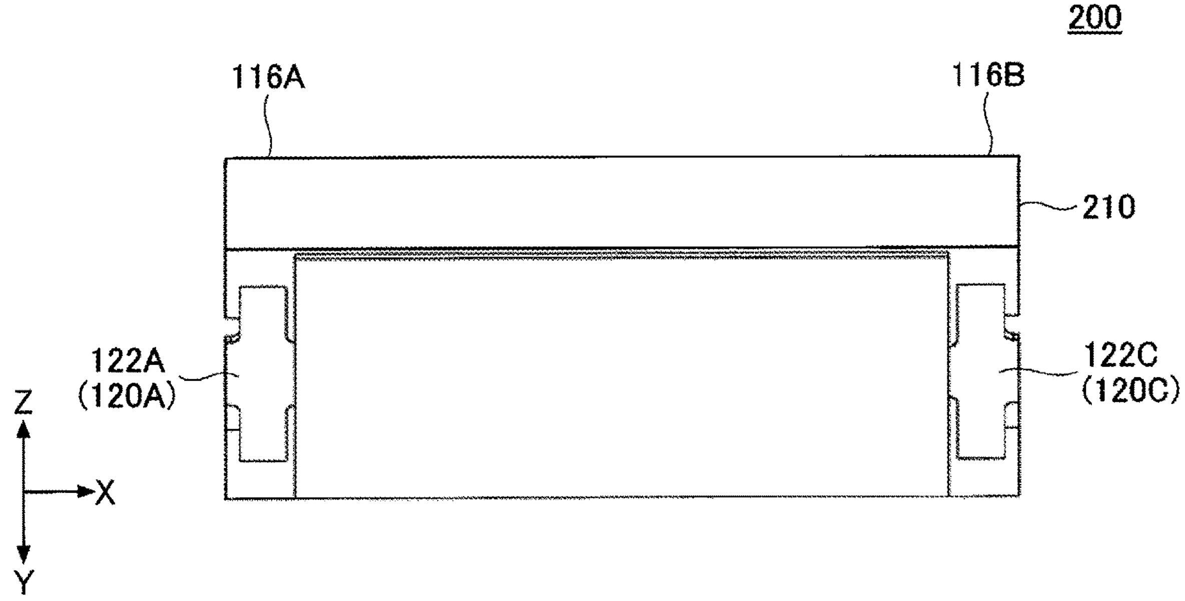
FIG. 11 is a perspective view of the push switch 200.
Figure 12:
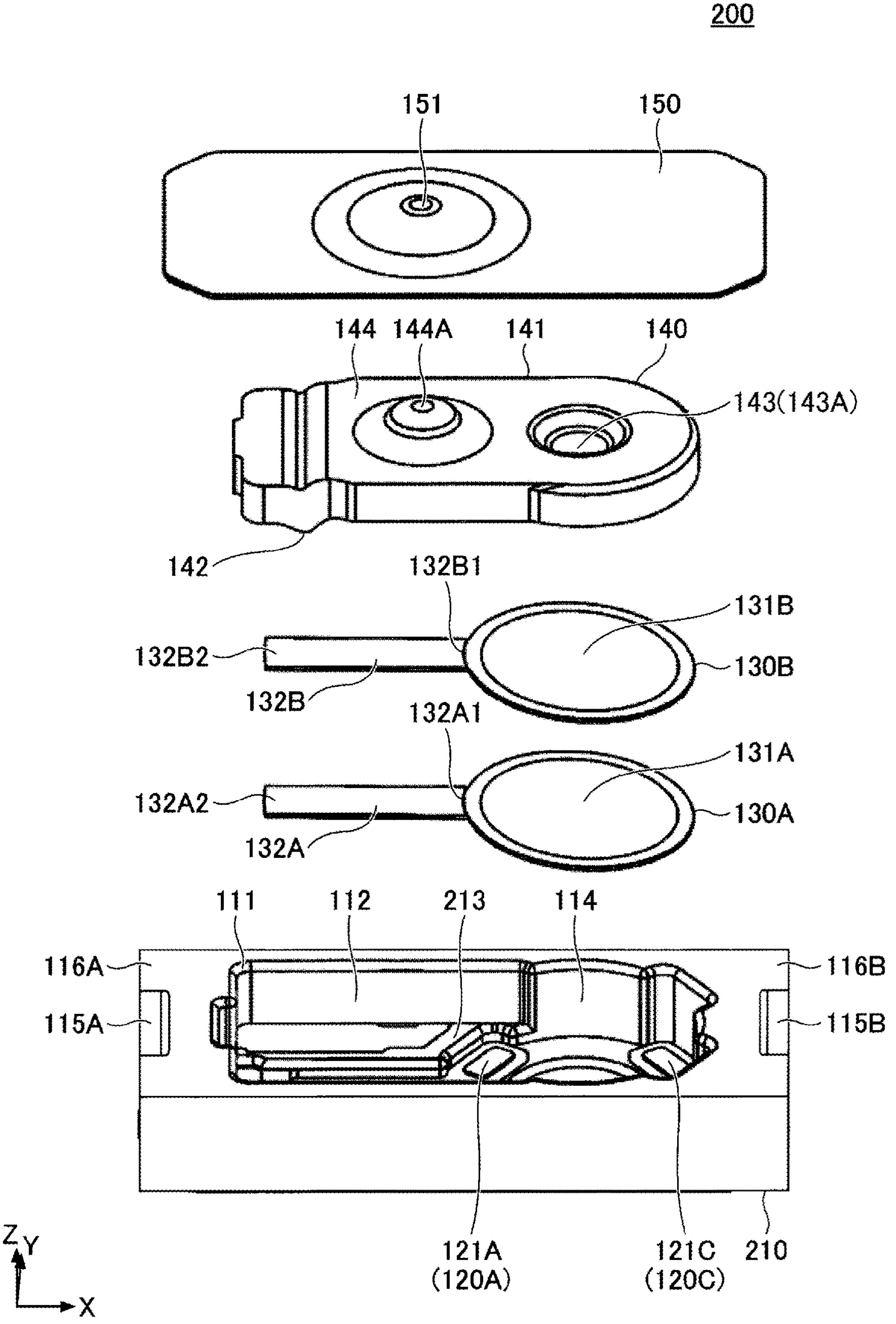
FIG. 12 is an exploded view of the push switch 200.

FIG. 10 and FIG. 11 are perspective views of a push switch 200 according to a second embodiment. FIG. 12 is an exploded view of the push switch 200. In the second embodiment, an XYZ Cartesian coordinate system is used for description. For convenience of description, −Z side is referred to as a lower side or a bottom, and +Z side is referred to as an upper side or a top, but this positional relationship does not represent a universal relationship.

The push switch 200 includes a housing 210, the metal plates 120A and 120C, the metal contact 130A, the leaf spring 130B, the pressing member 140, and the insulator 150. The push switch 200 has a configuration in which the metal plate 120B is removed from the push switch 100 according to the first embodiment. Further, the push switch 200 includes the housing 210 instead of the housing 110 according to the first embodiment. Because the push switch 200 according to the second embodiment does not include the metal plate 120B, the shape of a bottom wall 213 of the housing 210 differs from the shape of the bottom wall 113 of the housing 110 according to the first embodiment. Other configurations are the same as those of the push switch 100 according to the first embodiment. The same components are denoted by the same reference numerals, and the description thereof will not be repeated. In the second embodiment, the metal plate 120C is an example of a second fixed contact member, and the peripheral fixed contact 121C is an example of a second fixed contact.

Figure 13:
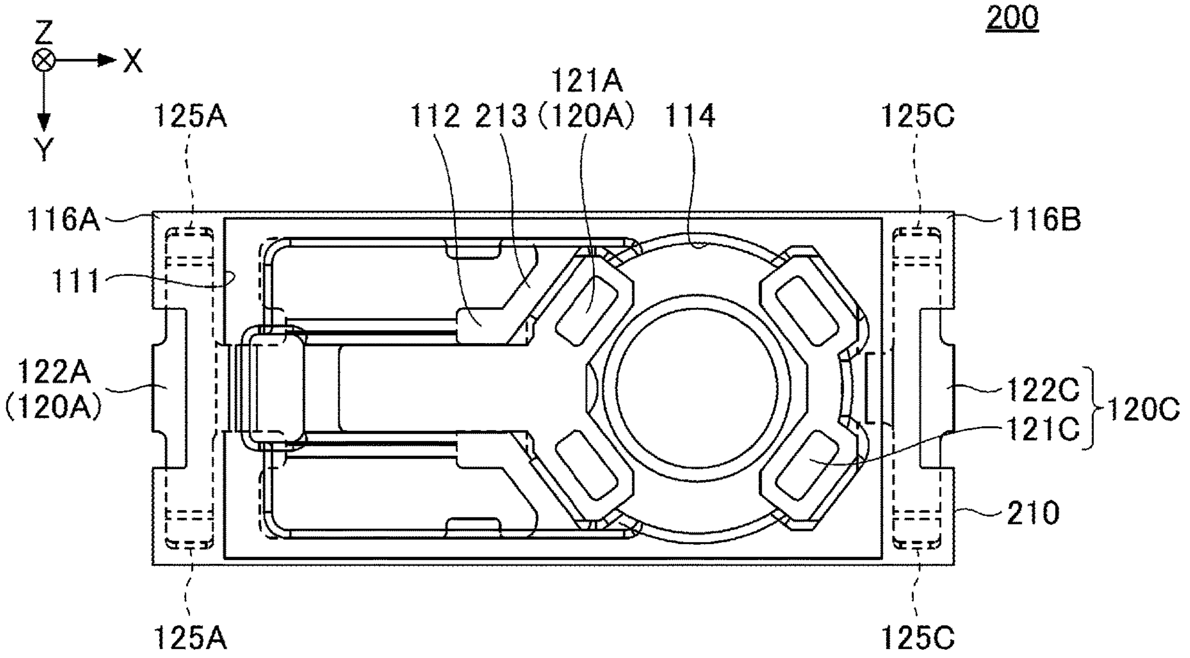
FIG. 13 is a drawing transparently illustrating the metal plates 120A and 120C embedded in a housing 210 by insert molding.
Figure 14:
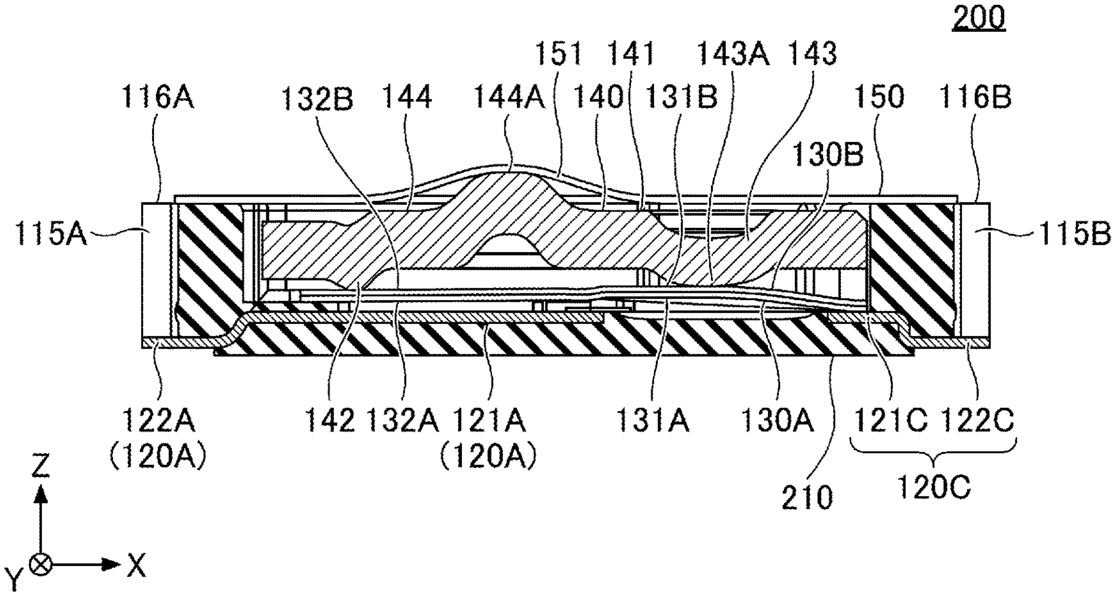
FIG. 14 is a drawing illustrating the cross-sectional structure and the operation of the push switch 200.
Figure 15:
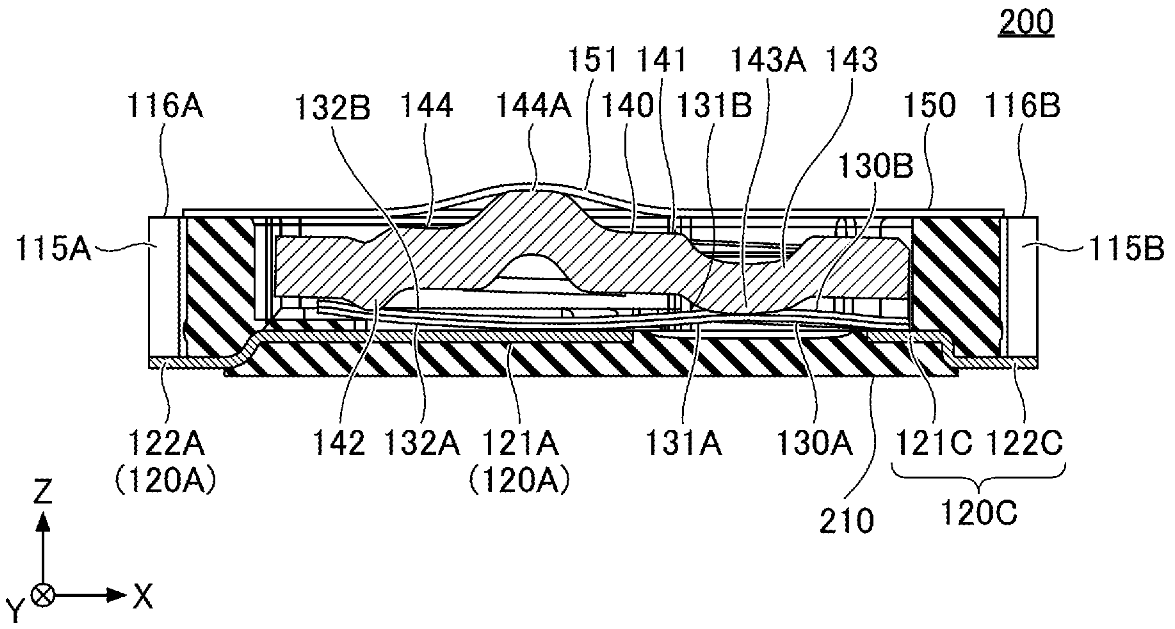
FIG. 15 is a drawing illustrating the cross-sectional structure and the operation of the push switch 200.
Figure 16:
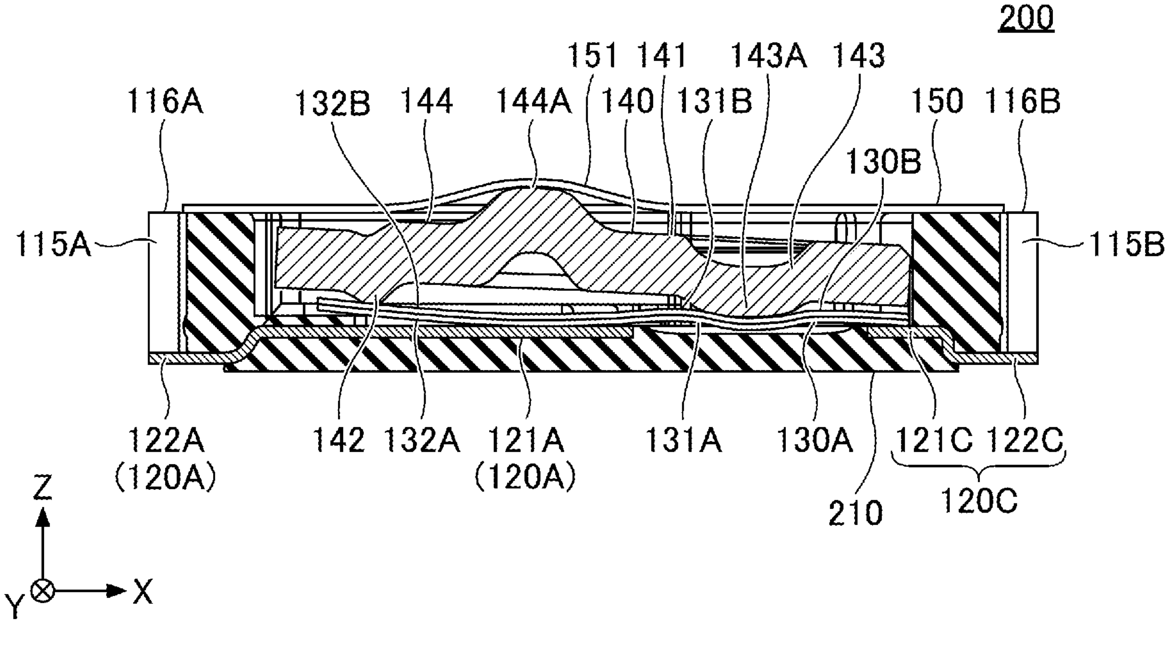
FIG. 16 is a drawing illustrating the cross-sectional structure and the operation of the push switch 200.

In the following, the metal plates 120A and 120C will be described with reference to not only FIG. 10, FIG. 11 and FIG. 12, but also FIG. 13. FIG. 13 is a drawing transparently illustrating the metal plates 120A and 120C embedded in the housing 210 by insert molding. The cross-sectional structure and the operation of the push switch 200 will be described with reference to FIG. 14 through FIG. 16 illustrating cross-sections of the push switch 100 taken through B-B of FIG. 10. Each of the cross-sections taken through B-B is a cross-section taken along the XZ plane passing through the center of the push switch 200 in the Y direction.

When the push switch 200 is off (in an electrically disconnected state), the metal contact 130A contacts the metal plate 120C (the peripheral fixed contact 121C), and does not contact the metal plate 120A (the peripheral fixed contact 121A). That is, the metal plate 120A is not electrically connected to the metal plate 120C. Pressing the insulator 150 down causes the metal contact 130A to be pressed down via the pressing member 140 and the leaf spring 130B. Then, the metal contact 130A contacts the metal plate 120A, and the metal plate 120A is electrically connected to the metal plate 120C through the metal contact 130A, thereby turning the push switch 200 on. In this state, the domes 131A and 131B of the metal contact 130A and the leaf spring 130B, respectively, are not inverted. The domes 131A and 131B are inverted upon the insulator 150 being further pressed in a state in which the metal plate 120A is connected to the metal plate 120C and the push switch 200 is turned on. Even when the domes 131A and 131B are inverted, the electrical state of the push switch 200 does not change. The domes 131A and 131B are inverted so as to increase the stroke of the push switch 200.

The housing 210 is made of a resin, and holds the metal plates 120A and 120C. The housing 210 and the metal plates 120A and 120C are integrally formed by insert molding. Because the housing 210 does not hold the metal plate 120B, the shape of the bottom wall 213 differs from the shape of the bottom wall 113 of the housing 110 according to the first embodiment.

In the push switch 200, upon the insulator 150 being pressed down to a first level (see FIG. 15), the connection portion 132A1 is pressed down and contacts the peripheral fixed contact 121A of the metal plate 120A, thus turning the push switch 200 on. In this state, the metal contact 130A electrically connects the peripheral fixed contact 121A to the peripheral fixed contact 121C. The position of the metal contact 130A at this time is an example of a first position. The state in which the metal contact 130A electrically connects the peripheral fixed contact 121A to the peripheral fixed contact 121C is an example of a contact state. In the first position, the domes 131A and 131B of the metal contact 130A and the leaf spring 130B, respectively, are not inverted.

Upon the insulator 150 being pressed down to a second level (see FIG. 16), the domes 131A and 131B are inverted and project downward (see FIG. 16). In this state, the dome 131A of the metal contact 130A contacts the bottom wall 213 of the housing 210. The position of the metal contact 130A at this time is an example of a second position. In this state, the metal contact 130A maintains the electrically connected state between the peripheral fixed contact 121A and the peripheral fixed contact 121C. That is, the push switch 200 remains on.

Figure 17:
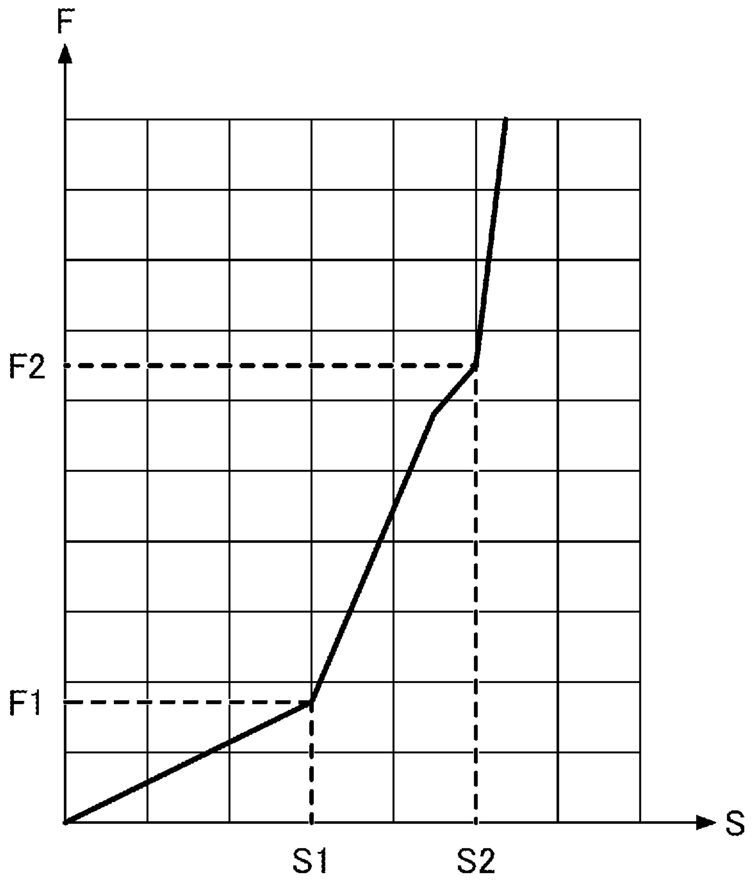
FIG. 17 is a graph indicating FS characteristics of the push switch 200.

FIG. 17 is a graph indicating force-stroke (FS) characteristics of the push switch 200. The horizontal axis represents a stroke (S) for pressing the insulator 150 down, and the vertical axis represents a force (F) required to press the insulator 150 down. The force (F) corresponds to the operating load.

As illustrated in FIG. 17, when the insulator 150 is pressed down from a zero-stroke position, the operating load gradually increases until the stroke reaches S1. During this time, the operating load is very small. The level at which the stroke for pressing the insulator 150 reaches S1 is the first level (see FIG. 15). A range from the zero-stroke position to S1 is an operating range in which the insulator 150 presses the projection 144A of the effort portion 144, the domes 131A and 131B of the metal contact 130A and the leaf spring 130B, respectively, are pressed by the load portion 143, the leg portions 132A and 132B are bent from the state illustrated in FIG. 14 to the state illustrated in FIG. 15, and the connection portion 132A1 contacts the peripheral fixed contact 121A. This indicates that the operating load required to bend the leg portions 132A and 132B is very small.

Upon the stroke exceeding S1, the load portion 143 of the pressing member 140 further presses the domes 131A and 131B of the metal contact 130A and the leaf spring 130B. Upon the stroke reaching S2, the operating load becomes F2, and the metal contact 130A and the leaf spring 130B are inverted. The level at which the stroke for pressing the insulator 150 reaches S2 is the second level (see FIG. 16). In this state, the metal contact 130A contacts the bottom wall 213 of the housing 210 with the domes 131A and 131B being inverted. Note that in the second level (see FIG. 16), the connection portion 132A1 of the metal contact 130A remains in contact with the peripheral fixed contact 121A.

When the insulator 150 continues to be pressed after the stroke reaches S2, the stroke increases to be slightly greater than S2 because of the shrinkage of the insulator 150 or the like. At this time, because the inverted domes 131A and 131B are pressed against the bottom wall 213, the operating load exceeds F2.

When the user presses the insulator 150 to the first level (until the stroke reaches S1) and the push switch 200 transitions to the contact state, the push switch 200 is turned on. Then, when the user further presses the insulator 150 to the second level (until the stroke reaches S2), the inverted domes 131A and 131B are pressed against the bottom wall 213. In this state, the user recognizes that the insulator 150 is fully pressed.

When the user weakens the force to press the insulator 150 and the stroke falls below S1, the metal contact 130A no longer contacts the peripheral fixed contact 121A, and as a result, the push switch 200 is turned off.

As described, after the insulator 150 is pressed until the stroke reaches S1 and the push switch 200 is turned on, the insulator 150 can be further pressed until the stroke reaches S2. Because the insulator 150 can be further pressed after the stroke reaches S1 and the push switch 200 is turned on, the user continues to press the insulator 150 until the insulator 150 can no longer be pressed (until the stroke reaches S2). Then, upon the stroke reaching S2, the user senses that the insulator 150 can be no longer pressed, and the user stops pressing the insulator 150.

That is, in order to turn the push switch 200 on, the user continues to press the insulator 150 until the stroke reaches S2. Then, even if the user slightly weakens the pressing force after the stroke reaches S2, the push switch 200 remains on as long as the stroke is greater than or equal to S1. Accordingly, the user can stably maintain the on-state of the push switch 200 for a long period of time.

Accordingly, a push switch 200 capable of being stably pressed and held for a long period of time can be provided.

According to an embodiment, a push switch capable of being stably pressed and held, and a push switch system can be provided.

Although examples of the push switch and the push switch system according to the embodiments of the present invention have been described above, the present invention is not limited to the above-described embodiments, and variations and modifications can be made without departing from the scope of the claims.

What is claimed is:

1. A push switch comprising:

a movable contact member that is deformable and has a spring characteristic;

a first fixed contact member that includes a first fixed contact configured to be contacted with and separated from the movable contact member; and a second fixed contact member that includes a second fixed contact configured to be contacted with and separated from the movable contact member, wherein the push switch is in a first contact state in a first contact position where the movable contact member contacts the first fixed contact in response to the movable contact member being pressed by a pressing operation, and the push switch is in a second contact state in a second contact position where the movable contact member contacts the second fixed contact in response to the movable contact member being further pressed by the pressing operation, wherein the push switch is not switched to an on state in response to transitioning from an off state to the first contact state, and is switched to the on state in response to further transitioning to the second contact state, and the push switch is not switched from the on state to the off state in response to the second contact state being released, and is switched from the on state to the off state in response to the first contact state being further released, wherein the on state is a state in which a predetermined connection terminal is conductible by the movable contact member contacting the predetermined connection terminal and the off state is a state in which the predetermined connection terminal is not conductible by the movable contact member separating from the predetermined connection terminal, and wherein the push switch starts the on state at the second contact state and continuingly maintains the on state until the first contact state is released.

2. The push switch according to claim 1, wherein the movable contact member contacts the second fixed contact in the second contact position.

3. The push switch according to claim 1, wherein the movable contact member includes a dome-shaped spring portion configured to be contacted with and separated from the first fixed contact and the second fixed contact, and a leg portion extending from an end of the dome-shaped spring portion.

4. The push switch according to claim 3, further comprising a case configured to house the movable contact member, the first fixed contact, and the second fixed contact, and a pressing member configured to press the movable contact member, wherein the leg portion includes a fixed portion configured to be fixed between the case and the pressing member or fixed to the case.

5. The push switch according to claim 3, further comprising a third fixed contact member that includes a third fixed contact, wherein the first fixed contact is disposed at a position that overlaps with a connection portion between the dome-shaped spring portion and the leg portion in a plan view, wherein the second fixed contact is disposed at a position that overlaps with a center portion of the dome-shaped spring portion in a plan view, wherein the third fixed contact is in contact with an outer end portion of the dome-shaped spring portion, wherein, in the off state, the connection portion is separated from the first fixed contact, and the center portion is separated from the second fixed contact, wherein, in the first contact position, the connection portion contacts the first fixed contact, the dome-shaped spring portion is not inverted, and the center portion is separated from the second fixed contact, and wherein, in the second contact position, the connection portion contacts the first fixed contact, and the dome-shaped spring portion is inverted so as to cause the center portion to contact the second fixed contact.

6. A push switch comprising:

a movable contact member that is deformable and has a spring characteristic; and a first fixed contact member that includes a first fixed contact configured to be contacted with and separated from the movable contact member;

a second fixed contact member that includes a second fixed contact; and a case having a housing portion for accommodating the movable contact member, the first fixed contact portion, and the second fixed contact portion, and a bottom wall located at a bottom of the housing portion;

wherein the push switch is in a contact state in a first position where the movable contact member contacts the first fixed contact in response to the movable contact member being pressed by a pressing operation, and the movable contact member is configured to be further pressed to a second position, wherein the movable contact member includes a dome-shaped spring portion, and a leg portion extending from an end of the dome-shaped spring portion, wherein the end portion of the dome-shaped spring portion is in contact with the second fixed contact portion, wherein, the push switch in the contact state at the first position when the pressing operation causes the leg portion to bend and contact the first fixed contact portion, and wherein, when the push switch is further pressed to the second position, the dome-shaped spring portion inverts while maintaining the contact state between the leg portion and the first fixed contact portion at the first position, causing the dome-shaped spring portion to come into direct contact with the bottom wall, and wherein the push switch is switched to an on state in response to transitioning from an off state to the contact state, and is switched from the on state to the off state in response to the contact state being released.

7. The push switch according to claim 6, further comprising a pressing member configured to press the movable contact member, wherein the leg portion includes a fixed portion configured to be fixed between the case and the pressing member or fixed to the case.

8. The push switch according to claim 7, wherein the movable contact member contacts the case in the second position.

9. The push switch according to claim 6, further comprising a second fixed contact member that includes a second fixed contact, wherein the first fixed contact is disposed at a position that overlaps with a connection portion between the dome-shaped spring portion and the leg portion in a plan view, wherein the dome-shaped spring portion of the movable contact member is configured to be inverted by the pressing operation, wherein the second fixed contact is in contact with an outer end portion of the dome-shaped spring portion, wherein, in the off state, the connection portion is separated from the first fixed contact, wherein, in the first position, the connection portion contacts the first fixed contact, and the dome-shaped spring portion is not inverted, and wherein, in the second position, the connection portion contacts the first fixed contact, and the dome-shaped spring portion is inverted.

10. A push switch system comprising:

a push switch; and a controller configured to determine whether the push switch is in an on state or in an off state, wherein the push switch includes a movable contact member that is deformable and has a spring characteristic;

a first fixed contact member that includes a first fixed contact configured to be contacted with and separated from the movable contact member; and a second fixed contact member that includes a second fixed contact configured to be contacted with and separated from the movable contact member, wherein the push switch is in a first contact state in a first contact position where the movable contact member contacts the first fixed contact in response to the movable contact member being pressed by a pressing operation, and the push switch is in a second contact state in a second contact position where the movable contact member contacts the second fixed contact in response to the movable contact member being further pressed by the pressing operation, wherein the controller does not determine that the push switch is switched to the on state in response to a transition from the off state to the first contact state, and determines that the push switch is switched to the on state in response to a further transition to the second contact state, and the controller does not determine that the push switch is switched from the on state to the off state in response to the second contact state being released, and determines that the push switch is switched from the on state to the off state in response to the first contact state being further released, wherein the on state is a state in which a predetermined connection terminal is conductible by the movable contact member contacting the predetermined connection terminal and the off state is a state in which the predetermined connection terminal is not conductible by the movable contact member separating from the predetermined connection terminal, and wherein the push switch starts the on state at the second contact state and continuingly maintains the on state until the first contact state is released.

* * * * *